Sept. 21, 1971  J. F. BAUMAN  3,606,747
INDICATING MEANS FOR GRASS CATCHING BAG AND THE LIKE
Filed March 5, 1970
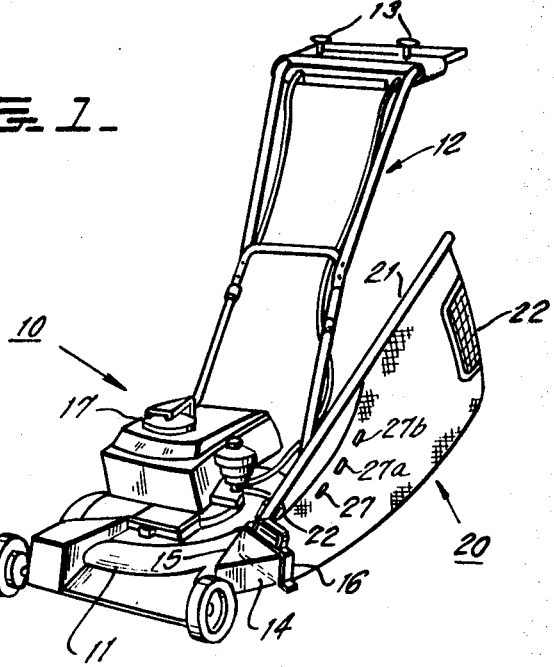
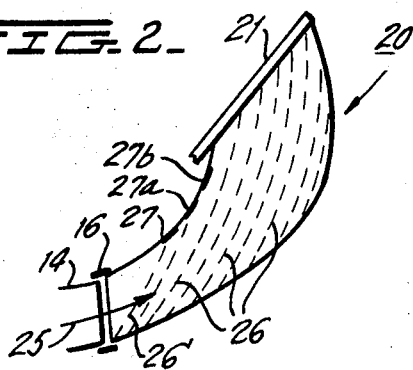
INVENTOR.
JOSEPH F. BAUMAN
BY
Ostrolenk, Faber, Gerb & Soffen
ATTORNEYS

United States Patent Office 3,606,747
Patented Sept. 21, 1971

3,606,747
INDICATING MEANS FOR GRASS CATCHING BAG AND THE LIKE
Joseph F. Bauman, 17 Great Woods Drive, Trenton, N.J. 08618
Filed Mar. 5, 1970, Ser. No. 16,897
Int. Cl. A01d 53/06
U.S. Cl. 56—202       10 Claims

ABSTRACT OF THE DISCLOSURE

A grass catching bag in which one or a plurality of slits or openings are provided near the inlet end of the bag so as to enable observation of grass clippings therethrough to permit the operator of the power mower to easily and readily determine the fact that the grass catching bag is nearly filled with grass clippings. The openings may be reinforced, may be provided with transparent windows of either a flexible or inflexible type, or may be provided with a movable "flag" or indicator which projects through the opening to indicate the fact that the bag is filled or nearly filled with grass clippings, or the like.

---

The present invention relates to power mowers, and more particularly to grass catching bags for use with power mowers, and the like, wherein the bag is provided with one or more visually observable indicating openings which are utilized to identify the fact that contents of the bag is nearly filled with grass clippings, or the like.

A wide variety of power mowers of the rotary type are presently employed in both residential and commercial applications wherein the grass (or other similar growth) is cut by means of rotating blades arranged within the power mower housing to rotate at relatively high angular velocities. The high r.p.m. of the blades cause the grass to be sucker up into the housing where each blade of grass is sharply cut by the rotating blades and wherein the grass clippings are forced out by the movement of air developed by rotation of the blades. The air-stream laden with grass clippings and other comminuted material is discharged through an outlet opening of the power mower housing and preferably collected within a grass catching bag whose inlet end is firmly connected with the outlet opening of the mower. Eventually (and most typically, long before the area being mowed is completed), the bag is filled with the grass clippings and other comminuted material to the point where the grass clippings will back up into the mower outlet opening and thereby clog the opening and either reduced or impair the operation of the power mower. In order to avoid such conditions, it is important that the bag be emptied at substantially regular intervals. To date, there is no convenient method or apparatus by which to determine when the bag is full or nearly full, and thereby should be removed, emptied of its contents and then replaced upon the mower outlet opening.

The present invention is characterized by providing a simple and yet highly effective means for determining when a grass catching bag is full, or nearly full.

The present invention is comprised of a grass catching bag which is provided with one or more slits or openings arranged near the inlet opening of the bag and in reasonably close proximity to the outlet port of the rotary-type power mower so that when the grass fills the bag to the point where the opening (or openings) are located, simple visual observation by the operator can be made in order to determine when the bag is filled. Various alternative arrangements may be provided wherein the opening may be a narrow slit of any one of a variety of configurations; may be provided with a flexible member secured to the opening, which member may or may not be transparent; may be provided with a rigid transparent member; or may be provided with a "flag" member which normally droops into the bag when the bag is either empty or when the grass clippings in the bag have not yet reached the "nearly full" point, and which is caused to project upwardly through an opening in the bag when the grass clippings reach the point at which the bag is nearly "full," whereby the grass clippings cause the "flag" member to project through the opening in the bag and thereby provide a readily observable indication of the fact that the bag is filled or nearly filled with grass clippings and/or other comminuted material.

It is, therefore, one object of the present invention to provide a novel indicating means for grass catching bags, and the like, to indicate when such bags are filled or nearly filled with grass clippings and/or other comminuted material.

Still another object of the present invention is to provide a novel grass catching bag for use with power mowers of the rotary-type and having either a narrow slit or a plurality of such slits which may be provided with or without a flag member or a flexible or inflexible member which may or may not be transparent to visually observe the bag in the region near its inlet opening and thereby ascertain whether the bag is filled or nearly filled with grass clippings and/or other comminuted material.

These as well as other objects of the present invention will become apparent when reading the accompanying description and drawing in which:

FIG. 1 is a perspective view showing a rotary-type mower and a grass catching bag mounted thereto.

FIG. 2 shows a perspective view of a portion of the outlet port of the mower and a bag connected thereto for explaining the advantages of the present invention.

FIG. 3a shows one type of indicator opening which may be provided on the bag.

FIG. 3b shows another type of opening which may be employed on the bag, and

FIG. 3c shows a view of the embodiment of FIG. 3b looking in the direction of arrows A—A.

FIGS. 4 through 7 are end views showing further alternative embodiments for the indicator device of the present invention.

FIG. 1 shows a rotary-type power mower 10 having a housing 11 which encloses the rotary blades (not shown). The handle assembly 12 is utilized to push the power mower and may be provided with conveniently located control 13 for regulating the speed and direction of the power mower. One side of housing 11 is provided with a curved deflector chute 14 which is coupled to the discharge port 15 of housing 11. The purpose of the chute is to extend the actual mower outlet port 15 to a position facing rearwardly generally toward the operator rather than extending laterally outward. The rearward end of deflector chute 14 is provided with a suitable conventional assembly 16 for coupling the inlet end of a grass catching bag 20 having a rearward portion thereof supported by an arm 21 which may be mounted by a bracket 22 upon the blade housing 11. The rearward end of the bag is preferably provided with a porous panel 23 to provide an exit for the air being forced into the bag if the bag is not essentially porous by nature.

FIG. 2 is a perspective view showing the manner in which the rotary blade mechanism, when driven by the motor 17 (see FIG. 1), of the power mower, drives or blows the grass clippings through the chute 14 in the direction shown by arrow 25, whereby the grass clippings are driven toward the rear of grass bag 20 and are caused to be deposited within the bag in a plurality of layers designated by the numeral 26, with the layers being formed from the right toward the left, somewhat as shown.

Each of the layers, which are substantially diagonally aligned, have their lower left-hand ends lying closer to the deflector chute 14 than the upper right-hand ends. Eventually, the last layer 26′ has its lower left-hand end lying in very close proximity to the point at which the curved deflector 14 is joined to the inlet opening of bag 20. If the power mower is continuously operated subsequent to the time that the last layer 26′ is formed, the additional layers formed will "back up" into the deflector chute 14 and thereby cause slow-up or stoppage of the power mower. It is, therefore, very desirable to provide some means for determining when the grass catching bag is "full" so that it may be removed at such time, emptied, and then replaced to enable the moving operation to be continued.

I have found that an excellent means for accurately determining when the grass catching bag 20 is "full" and without guessing as to when the bag is full, or without causing the mower to be slowed up due to the back-up of grass clippings, is to provide a small opening 27 (see also FIG. 1) which narrow opening or slit is clearly visible to the operator as the mower is being pushed across the area being cut. The upper right-hand end of layer 26′ (for example) will cause grass clippings in this vicinity to jut slightly through and out of opening 27 to provide a good visual indication of the fact that the grass collecting bag is nearly "full" and should be emptied relatively soon before any additional mowing.

If desired, a plurality of such openings, such as opening 27a and 27b, may be provided and arranged in a substantially linear fashion running from the inlet opening of the bag toward the rear of the bag so as to provide gradual indications of the fact that the bag is being filled. For example, layers collected in the bag prior to layer 26′ will have grass clippings near their upper right-hand ends caused to be jutted out of openings 27b, then 27a and finally 27, so that the operator may be apprised beforehand of the fact that the bag is approaching the point at which it will be filled with glass clippings. This arrangement will thereby enable the operator to be provided with gradual warnings as to the time when the bag will be full and allow the operator to determine when it is most appropriate to remove the bag, empty it and replace it for further cutting operations.

FIG. 3a shows the manner in which one such slit may be formed. If desired, the bag may simply be provided with a black mark, or other similar indication, and the words "Cut here" may be provided adjacent the marking to indicate that the user should slit the bag over the length of the mark which will then be employed as the means for indicating when the grass catching bag is nearly "full." Obviously, if a plurality of such marks are either required or desired, the bag may be provided with imprinted markings or lines indicating that the operator should slit the bag at each one of the small markings.

As a further alternative, the opening (or openings) may be made by the manufacturer and reinforcement of the openings may be provided by sewing or stitching the margin of the opening, as shown at 28 in FIG. 3a, to reinforce the opening and prevent it from becoming weakened and thereby being susceptible to being ripped. Obviously, each of the plural openings may be stitched in a similar manner, which stitching is substantially identical to the manner in which a buttonhole is stitched upon a garment, or other article of clothing.

FIGS. 3b and 3c show another alternative embodiment for reinforcing the openings or slits. As shown therein, the opening is provided with a metal eyelet 30 of a substantially oval shape, which eyelet is firmly compressed upon the bag so as to capture the marginal portion 27a of the opening between the overlaying flanges 30a and 30b of the eyelet. Obviously, in the case where plural openings or slits are provided, an eyelet may be provided for each of such openings to reinforce and thereby strengthen the openings and prevent them from fraying or ripping.

The openings may assume a variety of shapes and may, for example, be oval, circular, square-shaped, rectangular, and may be as narrow or as wide as is desired. For example, the openings may be narrow, rectangular slits of a width sufficient to permit the grass to jut out of the openings as the "last" layer 26′ is collected within the bag to indicate that the bag is nearly "full."

It has been found that a slit of approximately 1 inch in length is sufficient to be employed as an accurate means for observing the fact that the bag is full.

The exact location of the opening (or openings) may vary, depending upon the actual configuration of the bag employed to accommodate different models of power mowers. For example, in one type of power mower, it has been found that an opening spaced approximately 5 to 8 inches behind the deflector outlet has been satisfactory to indicate that the bag is nearly full. However, this range may vary, depending upon the ultimate configuration of the bag employed. The slits, or openings, should be placed conveniently on or near the top side of the bag, and need not be at the top dead center of the bag, so long as they are readily visible by the operator as the mower is being moved in the performance of the cutting operatiion. As one example, the openings may be provided to one side of the top dead center of the bag and preferably to that side which is closest to the mower and closest to the position assumed by the operator in pushing the mower.

Although the embodiments shown herein indicate the bag as being connected to a "walking" mower, it should be understood that a similar arrangement may be employed with "sit-down" mowers, with the understanding that the opening (or openings) should be positioned so as to be readily visible to the operator of the "sit-down" mower.

FIG. 4 shows an alternative arrangement for the grass bag indicator wherein the bag 20 is provided with an opening 27 of predetermined configuration. A substantially rigid, dome-shaped member 31 which may be formed of metal, plastic, rubber, or any other suitable material, is secured to a piece or strip of fabric 32 by staples, eyelets, thread, or any other suitable fastening means, generally designated by the numeral 33. The extreme ends of the fabric strip or section is sewn at 34 and 35 to the grass catching bag 20. In the case where the bag is either empty or the grass layers formed therein have not yet reached opening 27, there is sufficient "play" in the fabric strip 32 as to cause the dome-shaped screen member 31 to be suspended by strip 32 and to rest below the opening 27 in bag 20. Obviously, if desired, the opening 27 amy be provided with any suitable reinforcing means, such as, for example, an eyelet or stitching, to prevent the opening 27 from becoming frayed or being ripped. As the layers build up to the point where layer 26′ is formed (see FIG. 2, for example), the grass will build up beneath fabric strip 32, causing the fabric strip 32 and the dome-shaped member 31 to be lifted upwardly until the dome-shaped member 31 projects through opening 27. Obviously, the convex surface of dome-shaped member 31 may be painted or otherwise provided with a bright color or other indicia so as to be readily visible to the operator in order to indicate that the bag is full when the dome-shaped member 31 projects outwardly through opening 27. Obviously, once the bag has been emptied, the dome-shaped member will hang below opening 27, as shown best in FIG. 4a.

If desired, one or more such arrangements of the type shown in FIG. 4a may be provided at spaced intervals along the bag in the same manner as the openings 27, 27a and 27b, as shown in FIG. 1, for example.

FIG. 5 shows a slightly modified embodiment in which the embodiment of FIG. 4a may be modified as shown in FIG. 5, so that one end of the fabric strip 32 extends through a narrow slit or opening 27' in bag 20. The fabric strip is provided with a plurality of eyelets 36 arranged at spaced intervals along the fabric strip and provided to cooperate with one or more of a plurality of metallic or plastic disks 37, each having a small nipple-shaped projection for snappingly being received by one of the eyelets 36. The arrangement of FIG. 5 permits the "play" in fabric strip 32 to be adjusted. For example, the maximum amount of play may be obtained by snapping the right-handmost eyelet 36 into engagement with the left-handmost nipple member 37. Conversely, the minimum amount of "play" may be obtained by snappingly fitting the right-handmost nipple member 37 into the left-handmost eyelet member 36. Obviously, a plurality of dome-shaped assemblies of the type shown in FIG. 5 may be provided at spaced intervals in the same manner as a plurality of slits are provided along the bag, as shown, for example, in FIG. 1.

FIG. 6 shows still another alternative embodiment wherein the bag 20 is provided with an opening 27 which may be reinforced by any of the methods or techniques described hereinabove, and wherein a dome-shaped member 31 is secured to a rigid or slightly resilient member 38 whose free left-hand end is either sewn or otherwise fastened to bag 20 by fastening means generally designated by numeral 39, and which is provided with a "knee" portion 40 adapted to bend slightly under the weight of dome-shaped member 31 so as to enable the dome-shaped member 31 to hang downwardly below opening 27 in bag 20 in the case where the grass catching bag is either empty or the grass layers have not built up to the point occupied by layer 26' of FIG. 2. As the layers build up to the point where layer 26' is formed, the grass clippings in the region of the upper right-hand end of layer 26' are caused to urge resilient member 38 upwardly to force dome-shaped member 31 to project outwardly through the opening 27 in bag 20 and thereby provide an indication of the fact that the bag is nearly "full." If desired, a small strip of fabric 41 may be sewn at one end 42 to bag 20 and at the other end may be sewn or otherwise fastened to resilient member 38 at 43 so as to limit the distance that the dome-shaped member 31 may drop to below opening 27 in bag 20. In the case where a small fabric strip 41 is provided, the hinge or "knee" 40 may be made as flexible or bendable as possible, since the maximum distance below opening 27 which dome-shaped member 31 may occupy will be limited by the fabric strip 41. Obviously, the fabric strip 41 in the embodiment of FIG. 6 may be made adjustable in the manner shown in FIG. 5, if desired, so as to control the amount of "play" in the fabric strip.

It should be obvious that the dome-shaped member need not be a perfect dome, but can be of conical shape or any other suitable configuration so long as the projection of the member through the opening in the bag is easily discernible by the operator to thereby enable the operator to quickly and easily determine the fact that the bag is nearly "full" and should, therefore, be emptied.

As another obvious alternative, the openings or slits may be provided with a transparent "window" which is preferably porous and which the operator may look through in order to determine whether the grass has built up completely beneath the window. In such a case, the opening may be made slightly larger than those openings which are not provided with transparent windows so as to further facilitate observation of the window opening by the operator. If desired, the transparent window may be formed of a rigid transparent member such as glass or a clear plastic, or may be provided with a flexible, transparent plastic material which is sufficiently flexible as to be enabled to be pushed slightly out of the bag. For example, the bag 20 as shown in FIG. 7 is provided with an opening 27, and a transparent window 48 of a suitable transparent, flexible porous plastic material is sewn or glued into the bag about the marginal edge of opening 27, with the thread or other suitable fastening means being represented by numeral 49. When the grass clippings 26' build up in the region of opening 27, the flexible, plastic material is caused to project upwardly as shown to indicate that the grass catching bag is nearly "full." Obviously, if desired, the transparent window 48 may be replaced with any other plastic or fabric material so as to provide an indication that the bar is "full" (i.e., nearly "full") by virtue of the fact that the flexible member projects upwardly through opening 27. The advantage of providing a transparent, flexible member (or at least a reasonably transparent, flexible member) is that both observations (i.e., the ability to see the grass through the transparent window and the ability to note that the flexible member projects upwardly from opening 27) indicate the status of the contents of the grass catching bag.

It can be seen from the foregoing description that the present invention provides a novel indicating means for easily and readily determining when a grass catching bag is "full" or nearly "full" so as to permit the bag to be removed, emptied and replaced before the fullness of the bag with grass clippings cause the operation of the mower to either become sluggish or defective.

Although the invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an inclusive privilege or property is claimed are defined as follows:

1. A bag for collecting grass clippings and the like from power mowers having motor driven rotary blade assemblies which are adapted to cut grass and eject other comminuted material by means of an air flow generated by the mower to force the clippings out through an outlet opening; said bag being comprised of
   an inlet opening adapted to be releasably attached to the mower outlet opening to receive the comminuted material driven out of the mower;
   a rearward portion of the bag having means for connecting said bag to said mower to support the bag;
   said bag being formed of a flexible material and having at least a portion thereof which is porous to permit the escape of air while retaining the comminuted material in the bag;
   said bag having an opening at a point intermediate the ends thereof which is downstream relative to said inlet opening and is in view of the person operating said mower;
   said opening being adapted to enable an operator to view said opening when in the normal operating position to provide an indication that the bag is nearly full as a result of the comminuted material which fill the bag to the point of said opening and at least partially protrude therethrough.

2. The bag of claim 1 being further provided with a plurality of openings positioned downstream relative to said inlet opening to provide for a plurality of sequential indications that the bag is approaching the state of being full.

3. The bag of claim 1 further including means for reinforcing the marginal portion of the opening to prevent premature wearing of the bag in the region of the opening.

4. The bag of claim 1 wherein the opening is located in the range from 4 to 12 inches downstream from said inlet opening.

5. The bag of claim 1 further comprising a flexible member being sewn across said opening, said member being sufficiently resilient to project upwardly above the planar region defined by the opening under the influence of the comminuted material collected in the bag in the region of said opening to provide an indication that the bag is nearly full.

6. The bag of claim 1 further comprising a dome shaped member position within said bag;
   an elongated flexible strip of material; said member being secured to said strip at a point intermediate the ends thereof;
   the ends of said strip being secured to said bag to maintain said member in a position suspended beneath said opening whereby said member is adapted to project above the plane of said opening when the comminuted material has filled the bag to a point which includes the region of said opening to provide an indication that the bag is nearly full.

7. The bag of claim 6 wherein adjustable means is provided between said bag and one end of said strip to enable said member to be adjustably positioned below said opening when the bag is not filled to the point including said opening.

8. The bag of claim 5 wherein said flexible member is porous to prevent its being projected above the plane in the presence of air pressure developed by the mower.

9. The bag of claim 6 wherein said dome-sdaped member is porous to prevent its being projected above the plane in the presence of air pressure developed by the mower.

10. A bag for collecting grass clippings and the like from power mowers having motor driven rotary blade assemblies which are adapted to cut grass and eject other comminuted material by means of an air flow generated by the mower to force the clippings out through an outlet opening; said bag being comprised of an inlet opening adapted to be releasably attached to the mower outlet opening to receive the comminuted material driven out of the mower;
a rearward portion of the bag having means for connecting said bag to said mower to support the bag;
said bag being formed of a flexible material and having at least a portion thereof which is porous to permit the escape of air while retaining the comminuted material in the bag;
said bag having a mark on the exterior surface thereof at a point which is downstream relative to said inlet opening and is in view of the person operating said mower;
said mark being provided to locate a position where said bag is cut to define a small opening adapted to enable an operator to view said opening when in the normal operating position to provide an indication that the bag is nearly full as a result of the comminuted material which fill the bag to the point of said opening and at least partially protrude therethrough.

References Cited

UNITED STATES PATENTS

| | | | |
|---|---|---|---|
| 3,047,998 | 8/1962 | Leader et al. | 56—202 |
| 3,199,488 | 8/1965 | Farr | 116—114R |
| 3,230,696 | 1/1966 | Liljenberg | 56—202 |
| 3,269,101 | 8/1966 | Reynolds | 56—202 |
| 3,393,500 | 7/1968 | MacLeod et al. | 56—202 |

RUSSELL R. KINSEY, Primary Examiner

U.S. Cl. X.R.

116—114AD